United States Patent [19]

Weiss et al.

[11] Patent Number: 4,646,406
[45] Date of Patent: Mar. 3, 1987

[54] WELDED EDGE BOURDON STRIP THERMOMETER-MANOMETER

[75] Inventors: John Weiss, Amityville; William H. Slonaker, Baldwin, both of N.Y.

[73] Assignee: Weiss Instruments Inc., West Babylon, N.Y.

[21] Appl. No.: 671,557

[22] Filed: Nov. 15, 1984

[51] Int. Cl.[4] .......................... G01K 5/36; G01K 5/38; G01K 5/40
[52] U.S. Cl. ..................... 29/157 R; 73/741; 73/742; 73/743; 374/203; 29/454
[58] Field of Search ................. 73/741, 742, 743, 732; 374/203; 92/89, 90, 91; 29/454, 157 R; 228/155, 157, 231

[56] References Cited

U.S. PATENT DOCUMENTS 2,261,027 10/1941 Hopkins ............................. 73/731
2,712,240  7/1955 Booth ................................ 73/741
3,075,390  1/1963 Sheppard .......................... 73/732
3,992,944 11/1976 Woodle ............................ 374/203

FOREIGN PATENT DOCUMENTS 661778 11/1951 United Kingdom .
672252  5/1952 United Kingdom .

OTHER PUBLICATIONS

"Mechanical Measurements"—Beckwith, Buck, pp. 146-151.

Primary Examiner—Donald O. Woodiel
Attorney, Agent, or Firm—Frishauf, Holtz, Goodman & Woodward

[57] ABSTRACT

A bourdon tube for gas and liquid-filled thermometers and pressure gauges constructed by edge welding two strips of isoelastic nickel alloy to form a wall to wall low volume bourdon tube that exhibits a low ambient temperature effect and improved rangeability over all existing bourdon tubes used for temperature and pressure measurement and control.

8 Claims, 9 Drawing Figures

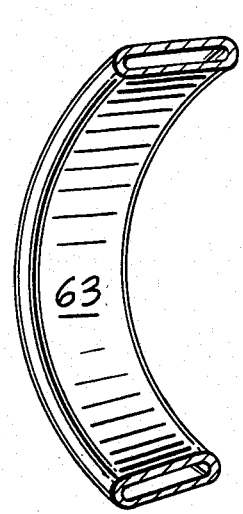 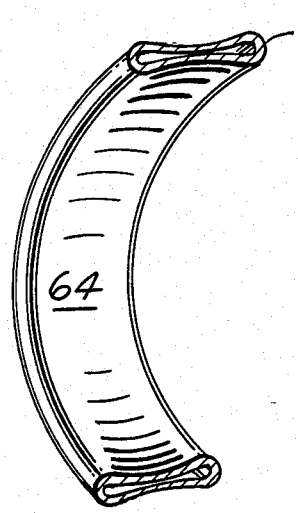 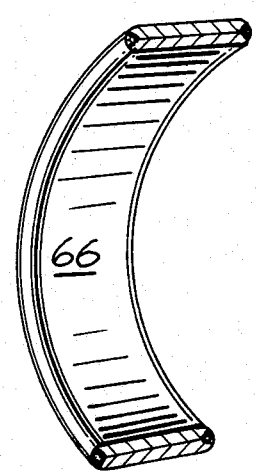
FIG. 6   FIG. 7   FIG. 8
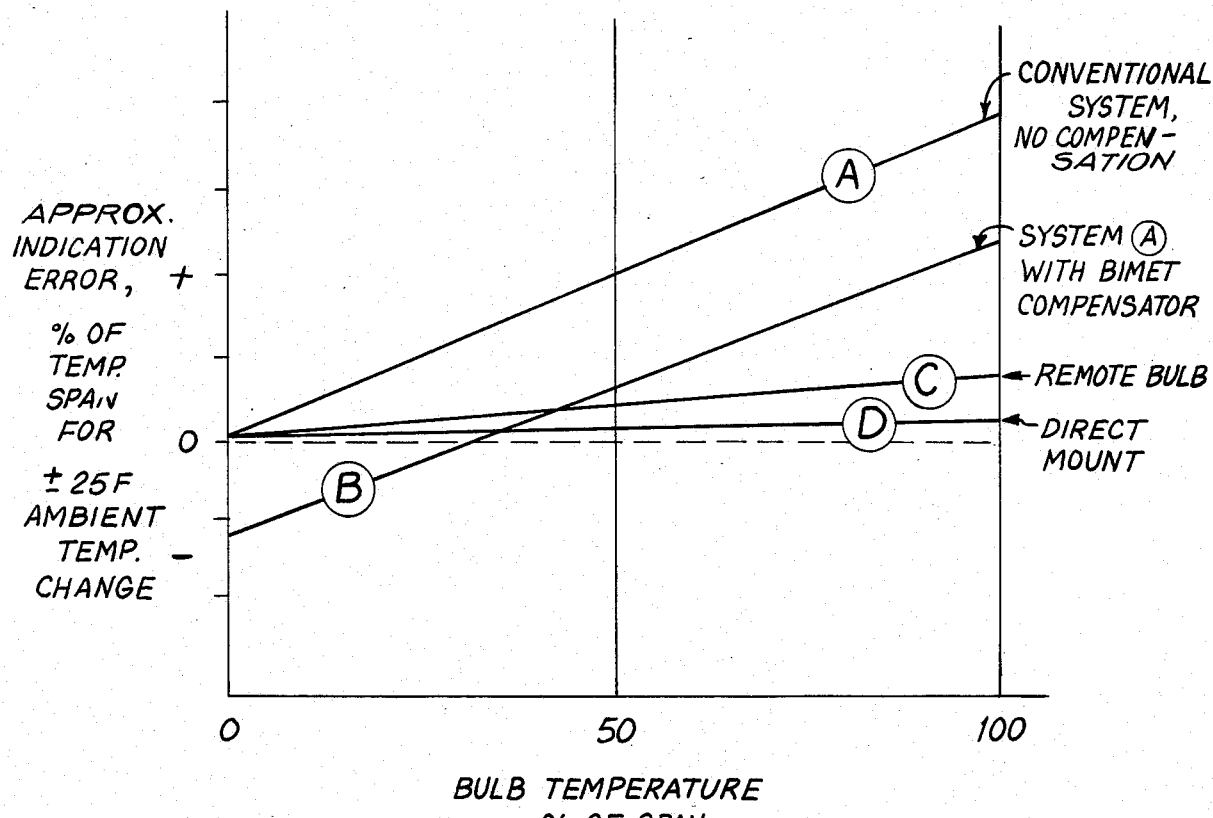
FIG. 9

WELDED EDGE BOURDON STRIP THERMOMETER-MANOMETER

BACKGROUND OF THE INVENTION

This invention relates to the construction of bourdon tubes for use as elastic members of a pressure or temperature sensing device. The bourdon tube as invented by E. Bourdon—U.S. Pat. No. 9163—is basically a tube, flattened and bent in a coil form. When this coiled, flattened tube is secured on one end and subjected to an internal pressure change the coil opens and closes in a near direct proportion to the internal pressure change. The translation of the free end of the bourdon tube is used as an input to a mechanical, electrical or electronic device to indicate and/or control pressure and temperature.

Many factors must be considered in bourdon tube design to meet the requirements of the application. Some factors affecting bourdon tubes are pressure-range, spring-rate, corrosion-resistance to internal fluid, corrosion-resistance to the external environment, repeatability, hysterisis, over-pressure and ambient temperature effect. The bourdon tube shape, size and material are selected for the particular application.

Filled-system thermometers and temperature controllers use bourdons to transduce a pressure change of the internal fluid (liquid, gas or vapor) to a mechanical movement used to drive a pointer or control mechanism. Filled-system thermometers are categorized as three (3) types: Class I—liquid Filled, Class II—Vapor actuated and Class III—Gas Actuated.

Class I utilizes the volumetric expansion of a solid liquid fill to produce a deflection of the bourdon tube with change of temperature. Mercury, zylene and silicone fluids are typical working internal fluids. The bulb size varies inversly with the temperature span. Short spans require larger bulbs, long spans smaller bulbs. The liquid in the bulb expands with increase of temperature and is hydraulically transferred to the bourdon tube through a fine-bore capillary. The volume of the capillary and bourdon are minimized so that ambient temperature effects on the liquid within the capillary and bourdon are minimized. To negate this "ambient temperature effect" several kinds of compensation are employed: (1) a bimetal on the bourdon output which nullifies the "ambient error" at one point (usually midspan), (2) duplicate capillary with opposing bourdon and (3) capillary filled with invar wire to negate capillary liquid expension.

Class II filled systems have fluids that generate predictable vapor pressure at a given temperature. Increasing bulb temperature vaporizes liquid in the bulb; decreasing temperature condenses saturated vapor in the bulb. The capillary and bourdon volume external to the bulb is filled with liquid when the bulb temperature is above ambient temperature and filled with superheated vapor when the bulb is below ambient temperature. When the bulb temperature increases through ambient temperature liquid transfers from the bulb into the capillary and bourdon, keeping the liquid-vapor interface in the bulb. Larger bulb sizes are required for cross ambient ranges and long capillary lengths.

Class III filled systems are gas-filled and react to changes in bulb temperature with a corresponding change in pressure approximately according to the natural gas law $pV = RT$. In order to minimize the ambient temperature effect the volume of the bulb is generally 20 to 30 times the volume of the capillary and bourdon tube combined. To obtain narrow temperature spans relatively high internal operating pressures are required and "ambient temperature effect" is greater for higher internal pressures. Therefore, ranges of Class III systems are limited by the elastic range of the bourdon tube and the allowable ambient effect.

Enhanced gas thermal systems overcome the need to have large bulbs by including activated carbon in the bulb to adsorb and desorb gas molecules, amplifying pressure changes beyond that of the natural gas laws. Enhanced gas systems have the advantage that narrow temperature spans can be achieved with lower internal operating pressure and hence lower "ambient effect". This also permits the use of smaller bulbs.

On all temperature and pressure sensing systems employing bourdons made of conventional metallic materials, accuracy is also affected when ambient temperature changes alter the tensile modulus of elasticity of the bourdon. On bourdons made of spring brass, for example, the effect on the spring rate is approximately 0.02% per °F. or 1% per 50° F. ambient temperature change. (Mechanical Measurements, Beckwith & Buch, p.159).

In the case of filled-system thermometer elastic elements, because they are required to operate at elevated pressure spans and hence elevated stress levels, indication errors caused by changes in ambient temperature may be on the order of 3 to 4 times greater.

SUMMARY OF THE INVENTION

It is the object of the invention to provide an elastic element for filled-system thermometers, especially Class III, Gas Actuated based on the following criteria:

1. Material and configuration should have highest possible elastic limit.
2. Configuration should have lowest possible internal volume and volumetric change during operation.
3. Material elastic modulus should be insensitive to normal ambient temperature changes.
4. Material should exhibit minimum hysteresis at elevated stress levels.
5. Material and construction must be able to operate at high stress levels for the life of the instrument without drifting or failure.
6. Material must resist corrosion from the internal fill-media and be reasonably resistant to its external environment.
7. Material configuration and manufacturing costs must be economically feasible for use in products sold in a highly competitive industrial market.

The discovery has been made, by this invention, that metal strips capable of being made isoelastic by heat treatment, for example, Ni-Span C strips, can be edge-welded by modern continuous edge-welders to produce gas-tight narrow passages in a structure that can be formed into a bourdon tube and then heat treated, preferably in dry hydrogen, for isoelasticity without sticking together the closely facing surfaces of the strip. Alloys with isoelastic potential for making flat bourdon tubes according to the invention are on the market. Such materials are heat-treated by age hardening to obtain a thermo-elastic coefficient at or near zero. The thermo-elastic coefficient can be reduced by 10 to 1 or more after heat treating. For example, $-200 \times 10^{-6}$ psi/psi°F. before and $-20 \times 10^{-6}$ psi/psi°F. after age hardening.

The greatest stress on the bourdon tube is at the side walls. The invention has the further unexpected advantage that the edge-weld reliably provides strength exactly where it is needed.

The invention comprises a bourdon-like device of two thin isoelastic strips, placed back-to-back, edge-welded to form a pressure envelope forming it into an appropriate shape, attaching mounting and takeoff menas, heat treating the assembly to obtain maximum spring properties and an isoelastic tensile modulus and attaching to a suitable capillary and bulb assembly.

BRIEF DESCRIPTION OF THE DRAWINGS

FIGS. 6, 7 & 8 show cross-sectioned views of three bourdons including this invention.

FIG. 9 is a plot of ambient temperature errors of conventional, compensated and the edge welded isoelastic bourdons of this invention.

DESCRIPTION OF THE PREFERRED EMBODIMENTS

Figure 1:
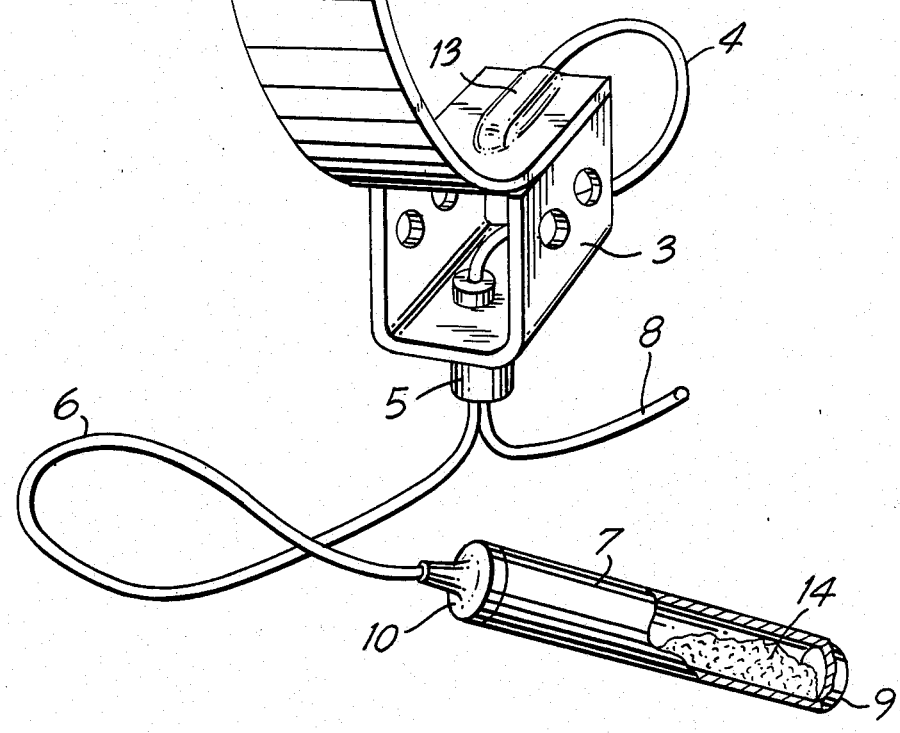
FIG. 1 is a perspective view of a C shape bourdon tube of the present invention attached to a remote temperature sensor.

In the embodiment shown in FIG. 1 two 0.016" thick by 0.563" wide strips of nickel alloy Ni-Span C (Ni-Span C is a registered trademark of Huntington Alloys, Inc.) are tightly placed one on top of the other and welded along both edges 11 & 12 by a suitable means (TIG, electron-beam, laser-beam, etc.) then cut to a length of 3.6". One end is spread 13 to receive a capillary. Both ends, except the capillary opening, are preferably TIG-welded to provide an integral, hermetically sealed pressure envelope. The strip assembly 1 is formed into a C-shaped bourdon tube. A take-off 2 is welded to one end for attachment to a motion transducer such as a gauge movement or electronic device. The end with the capillary opening 13 is left straight and is welded to a bracket 3. The bracket provides a means for mounting the motion transducer, a capillary holddown or connector 5 and the entire assembly into an encasement.

The bourdon/take-off/bracket assembly is heat-treated according to recommended practices to obtain maximum spring properties and a "zero" thermoelastic coefficient in the bourdon.

A short length of 0.048 outside diameter and 0.009 inside diameter (low internal volume) capillary 4 is inserted into the bourdon at 13 and brazed to seal. This capillary is used to leak-test and overpressure the assembly and ultimately joined to a bulb and capillary via connector 5.

When joined to a Class III enhanced gas temperature system, connector 5 provides a junction for line capillary 6 and fill-capillary 8. Both capillaries have small bores (0.005 to 0.010) to minimize their internal volume. Line capillary 6 may be suitably armored for protection.

Joined to capillary 6 is an appropriate sensing bulb 7 containing a measured quantity of carbon 14.

The entire assembly is evacuated through the fill-tube 8 and an inert gas such as dry nitrogen introduced into it.

Figure 2:
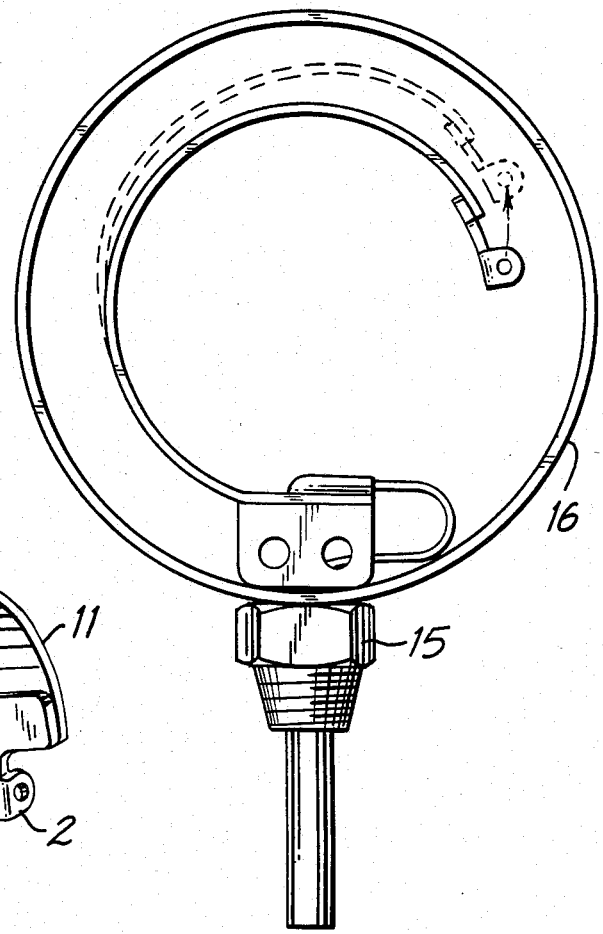
FIG. 2 is a face-on view of the bourdon tube of FIG. 1 attached to a direct mount temperature system and showing the deflection for increasing internal pressure.

With the sensing bulb 7 at an appropriate temperature, the internal gas pressure is controlled at that value which will establish the desired temperature span of the system. The fill-tube 8 is then closed off and sealed. A change in the sensor temperature now causes a corresponding internal pressure change of the entire system and a deflection of the free end of the bourdon tube (as shown in FIG. 2). The deflection is picked off and converted through a geared movement to a pointer rotating over a circular scale. In an electronic system, deflection is sensed by a position transducer such as a strain gauge, linear transducer or a light vane passing through a photovoltaic circuit.

For direct mount applications, FIG. 2, the system capillary is eliminated and a case fitting 15 directly connects the bulb to the case 16 and the bourdon system.

Figure 3:
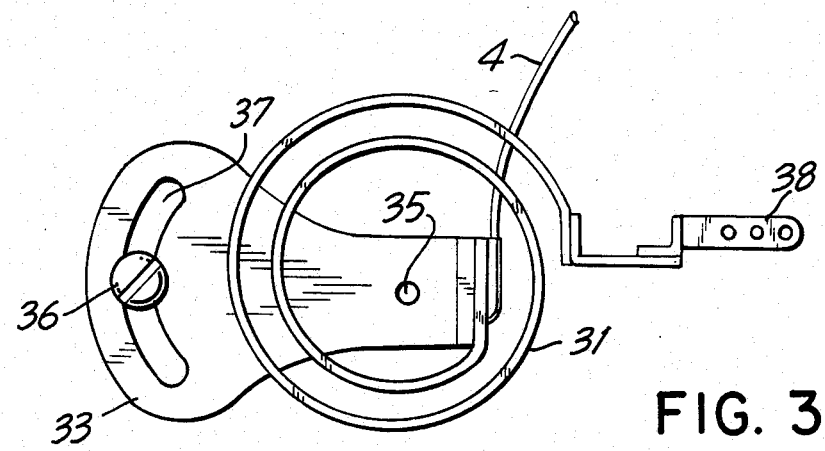
FIG. 3 is an edge-on view of a spiral bourdon tube constructed according to the present invention.
Figure 4:
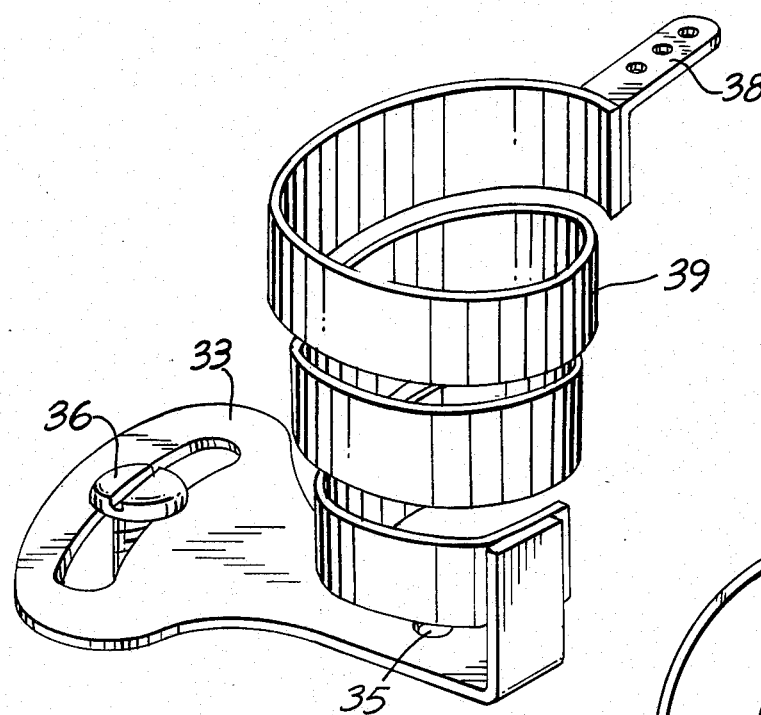
FIG. 4 is a perspective view of a helical Bourdon tube of the present invention.

In applications that require high force and a large deflection, such as controllers or recorders, a spiral bourdon configuration of the present invention (see FIG. 3) would have many design advantages. The edge-welded tube 31 is formed into a spiral and welded to a mounting bracket 33 and a takeoff 38 is welded to the free end. The mounting bracket is fastened to a plate in the instrument case with a center pivot pin 35 and a locking screw 36 within the bracket slot 37 to reset the position of the takeoff for multiple ranges. Similarly, a helical bourdon tube 39 (in FIG. 4) can be used.

Figure 5:
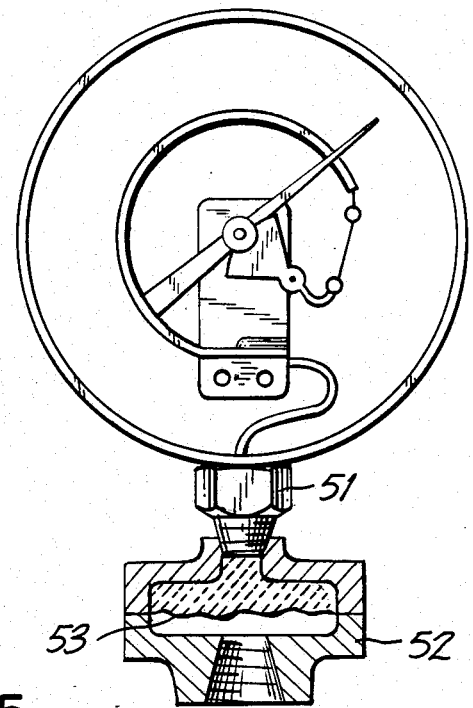
FIG. 5 is a cutaway view of a pressure sensing device constructed with the edge welded bourdon tube of the present invention.

FIG. 5 illustrates the use of the bourdon of this invention in a pressure gauge. The case fitting 51 is the process connector. This bourdon's particular advantages as a pressure sensor are its high overrange capability, linear output and low ambient temperature effect. A diaphragm seal 52 can be ued to isolate the gauge from a "Dirty" or corrosive process. The volume within the bourdon system and over the diaphragm 53 is filled with an incompressible liquid to hydraulically transfer the displacement of the diaphragm to the bourdon. Because of its low volume and small volumetric change, this bourdon system permits the use of a smaller diaphragm (less displacement) and is less sensitive to ambient temperature.

FIGS. 6, 7 & 8 show by comparison of end-view-cross-sections that internal volume is minimized in FIG. 8 the present invention. Conventional bourdon tubes as shown in FIG. 6 have excessive internal volume for gas thermometers. "Flattening" the bourdon tube as shown in FIG. 7 reduces but does not minimize the internal volume, primarily because of unavoidable "dogboning" 65 and metal springbacks. Flattening also causes high residual stresses and cracking in the edge radii if the bourdon is not appropriately stress-relieved.

The graph in FIG. 9 shows the effects of a 25° F. ambient temperature change on four Class III gas-filled thermometers as a function of bulb temperature. Two of the thermometers C & D have bourdon systems described in the Preferred Embodiment above. Each system has a 0.375" diameter×3.0" long bulb and, except for the direct mount type, 30 ft. of line capillary.

Curve A shows typical error exhibited by a conventional bourdon with an enhanced gas system with no ambient temperature compensation.

Curve B shows the effect on system A when a bimetallic compensator is added. The bimetal compensates only ambient temperature changes in proximity to the case and then only at one bulb temperature, usually mid-span.

Curve C is an enhanced gas thermometer utilizing the preferred embodiment bourdon system (see FIG. 1) and 30 ft. of capillary. Note the significant reduction in ambient error over systems A and B.

Curve D is a direct mount thermometer with the Preferred Embodiment construction (see FIG. 2). Capillary ambient effect is negligible.

Curves C & D demonstrate that the Preferred Embodiment constructed thermometers have significantly less ambient error and therefore have the potential for multiranging (raising a rated temperature span upward through higher ranges), providing shorter rated spans and/or using smaller sensor bulbs. For thermometers, of course, the sensing container 9 should be rigid.

The minimum rated temperature span on a conventional gas thermometer is about 300° F. With an enhanced gas system it is approximately 120° F. Utilizing the Preferred Embodiment construction, an enhanced gas thermometer can easily provide a 40° F. temperature span.

An advantage of the invention is the ability to use a small "bulb" to fit into standard thermowells used for thermocouples, RTD probes and bimetal thermometers.

The illustrations of the Preferred Embodiment are chosen to demonstrate a radical improvement over conventional methods. However, the scope of the invention is not limited to this case. Any temperature or pressure system can take advantage of the increased rangeability, substantially reduced ambient temperature effects and the large overrange capability obtained by using the edge welded isoelastic bourdon tube of this invention.

TIG-welding is the common name for arc-welding under inert gas with a tungsten electrode for producing the arc that does not contribute any metal to the weld. Rangeability means the ability to shift the entire span of the instrument over a wide range.

We claim:

1. Method of manufacturing a gas-filled thermo-elastic device for measuring gas pressure therein, comprising:

welding two elongate flat strips of metal together at their edges, including the end edges, to produce a welded strip assembly, said metal being an alloy in its annealed state which is capable of being heat treated by age hardening for thereby obtaining a thermo-elastic coefficient of a magnitude so small as to be negligible for thermometric purposes;

producing an aperture between the edges of the welded strip assembly at one end of the strips giving access to the thin gap between the unwelded portions of the facing surfaces of the edge-welded strips;

bending said welded strip assembly arcuately to produce a welded strip Bourdon tube;

heat treating said Bourdon tube to bring the thermo-elastic coefficient thereof to a value not differing from zero by more than $20 \times 10^{-6}$ psi/psi°F. while admitting a controlled atmosphere into the tube;

connecting said aperture to a gas container and connecting the end of said Bourdon tube remote from said aperture to an indicating device, and filling said Bourdon tube, said container and the connection there between, constituting a thermometer assembly, with a thermometric gas material at a selected pressure and temperature, followed by sealing said filling in said thermometric assembly.

2. Method according to claim 1, in which said controlled atmosphere is a reducing atmosphere.

3. Method according to claim 2, in which said reducing atmosphere is an atmosphere of dry hydrogen.

4. Method according to claim 1, in which the step of producing said aperture is performed by the procedure known as "bumping" in which a pin is punched in between the strips raising a bump on the outer surface of at least one of the strips.

5. Method according to claim 1, in which there is also performed the step of mounting the end of the welded strip Bourdon tube which contains said aperture onto a support structure.

6. Method according to claim 1, in which said welded strip assembly is bent in the form of an arc of more than 180°.

7. Method according to claim 1, in which the step of bending said welded strip assembly is performed by bending it into a spiral configuration.

8. Method according to claim 1, in which the step of bending said welded strip assembly is performed by bending it into a helical configuration.

* * * * *